(12) United States Patent
Neufarth et al.

(10) Patent No.: US 11,975,522 B2
(45) Date of Patent: May 7, 2024

(54) BLOW MOLDED MULTILAYER ARTICLE WITH COLOR GRADIENT

(71) Applicant: The Procter & Gamble Company, Cincinnati, OH (US)

(72) Inventors: Bradley Scott Neufarth, Loveland, OH (US); Andrew Joseph Horton, Middletown, OH (US); Amanda Susan Ehrhardt, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/144,281

(22) Filed: Jan. 8, 2021

(65) Prior Publication Data

US 2021/0206141 A1 Jul. 8, 2021

Related U.S. Application Data

(60) Provisional application No. 62/958,507, filed on Jan. 8, 2020.

(51) Int. Cl.
*B32B 1/02* (2006.01)
*B32B 1/00* (2006.01)
(Continued)

(52) U.S. Cl.
CPC ............... *B32B 7/023* (2019.01); *B32B 1/00* (2013.01); *B32B 5/145* (2013.01); *B32B 27/08* (2013.01); *B32B 27/36* (2013.01); *B65D 1/0215* (2013.01); *B29C 2949/072* (2022.05); *B29C 2949/30* (2022.05); *B29C 2949/3032* (2022.05); *B29K 2067/003* (2013.01); *B29K 2995/0021* (2013.01); *B29L 2031/7158* (2013.01); *B32B 2250/03* (2013.01); *B32B 2250/244* (2013.01); *B32B 2250/40* (2013.01);
(Continued)

(58) Field of Classification Search
CPC ................. B65D 1/0215; B32B 7/023; B32B 2307/4026; B29B 11/08; B29B 11/14; B29C 49/06–0665; B29L 2031/7158
USPC .................. 428/34.1–36.92, 35.7, 36.6, 36.7
See application file for complete search history.

(56) References Cited

U.S. PATENT DOCUMENTS

| 1,554,191 A | 9/1925 | Alexander |
| 3,222,439 A | 12/1965 | Bolomey et al. |

(Continued)

FOREIGN PATENT DOCUMENTS

| CN | 1538995 A | 10/2004 |
| CN | 1673284 A | 9/2005 |

(Continued)

OTHER PUBLICATIONS

PCT Search Report and Written Opinion for PCT/US2021/012602 dated Apr. 16, 2021.

(Continued)

*Primary Examiner* — Michael C Romanowski
(74) *Attorney, Agent, or Firm* — Jay A. Krebs; Alexandra S. Anoff

(57) ABSTRACT

A blow molded multilayer article with a hollow body defined by a wall with an inner surface and an outer surface. The outer surface has an axial color gradient. The wall has multiple layers and at least one layer optionally contains an effect pigment and/or an opacifying pigment.

19 Claims, 6 Drawing Sheets
(6 of 6 Drawing Sheet(s) Filed in Color)

(51) Int. Cl.
  B32B 5/14 (2006.01)
  B32B 7/023 (2019.01)
  B32B 27/08 (2006.01)
  B32B 27/36 (2006.01)
  B65D 1/02 (2006.01)
  B29C 49/22 (2006.01)
  B29K 67/00 (2006.01)
  B29L 31/00 (2006.01)

(52) U.S. Cl.
  CPC . *B32B 2307/4026* (2013.01); *B32B 2307/404* (2013.01); *B32B 2307/732* (2013.01); *B32B 2439/60* (2013.01); *B65D 2501/0081* (2013.01)

(56) References Cited

U.S. PATENT DOCUMENTS

| | | | |
|---|---|---|---|
| 3,420,924 A * | 1/1969 | Fuerst | B29C 48/09 |
| | | | 264/108 |
| 3,550,197 A | 12/1970 | Szajna et al. | |
| 4,174,413 A | 11/1979 | Kataoka et al. | |
| 4,421,560 A | 12/1983 | Kito et al. | |
| 4,457,961 A | 7/1984 | Nakazawa | |
| 4,535,901 A * | 8/1985 | Okudaira | B32B 27/28 |
| | | | 215/12.2 |
| 4,728,549 A * | 3/1988 | Shimizu | B32B 27/34 |
| | | | 264/153 |
| 4,868,026 A | 9/1989 | Shimizu | |
| 4,919,983 A | 4/1990 | Fremin | |
| 4,957,949 A | 9/1990 | Kamada et al. | |
| 4,994,313 A | 2/1991 | Shimizu | |
| 5,431,697 A | 7/1995 | Kamata et al. | |
| 5,595,799 A | 1/1997 | Beck et al. | |
| 5,628,950 A | 5/1997 | Schrenk et al. | |
| 5,628,957 A | 5/1997 | Collette et al. | |
| 5,712,009 A | 1/1998 | Moore et al. | |
| 5,849,224 A | 12/1998 | Valyi | |
| 5,927,525 A | 7/1999 | Darr et al. | |
| 6,123,211 A | 9/2000 | Rashid et al. | |
| 6,129,960 A | 10/2000 | Kudert et al. | |
| 6,294,602 B1 | 9/2001 | Shimo et al. | |
| 6,296,911 B1 | 10/2001 | Catarineu | |
| 6,344,249 B1 * | 2/2002 | Maruyama | B29C 45/1646 |
| | | | 264/328.8 |
| 6,405,867 B1 | 6/2002 | Moore | |
| 6,562,276 B1 | 5/2003 | Shelby et al. | |
| 6,596,213 B2 * | 7/2003 | Swenson | B29C 45/1643 |
| | | | 264/328.8 |
| 6,663,822 B1 | 12/2003 | Cargill | |
| 6,737,132 B1 | 5/2004 | Michihata et al. | |
| 6,815,080 B2 | 11/2004 | Omori | |
| 6,878,774 B2 | 4/2005 | Kikuchi et al. | |
| 6,911,266 B1 * | 6/2005 | Skov | B65D 1/10 |
| | | | 264/513 |
| 6,929,136 B2 | 8/2005 | Salazar-leal | |
| 6,929,836 B2 | 8/2005 | Kikuchi | |
| 7,534,829 B2 | 5/2009 | Tai et al. | |
| 7,662,466 B2 | 2/2010 | Seeboth et al. | |
| 7,828,890 B2 | 11/2010 | Henglein | |
| 7,837,048 B2 * | 11/2010 | Lusker | B65D 1/0223 |
| | | | 215/379 |
| 7,906,054 B2 | 3/2011 | Hirschfelder et al. | |
| 8,061,540 B2 * | 11/2011 | Toyoda | B32B 3/04 |
| | | | 215/12.2 |
| 8,097,317 B2 | 1/2012 | Katou | |
| 8,124,234 B2 | 2/2012 | Weaver et al. | |
| 8,485,935 B2 | 7/2013 | Hecht | |
| 8,535,595 B2 | 9/2013 | Meiki et al. | |
| 8,580,365 B2 | 11/2013 | Abe | |
| 8,734,923 B2 | 5/2014 | Shi | |
| 8,883,920 B2 | 11/2014 | Inoue et al. | |
| 8,895,120 B2 | 11/2014 | Dierickx | |
| 8,968,147 B2 | 3/2015 | Hecht | |
| 9,000,068 B2 | 4/2015 | Trummer | |
| 9,114,895 B2 | 8/2015 | Sato et al. | |
| 9,162,429 B2 | 10/2015 | Suga et al. | |
| 9,597,825 B2 | 3/2017 | Schmidt et al. | |
| 9,708,092 B2 | 7/2017 | Bowen et al. | |
| 9,731,482 B2 | 8/2017 | Arakawa et al. | |
| 9,862,157 B2 | 1/2018 | Hosokoshiyama | |
| 10,279,948 B2 | 5/2019 | Yang et al. | |
| 10,518,922 B2 | 12/2019 | Yang et al. | |
| 11,046,473 B2 | 6/2021 | Agerton et al. | |
| 2002/0009565 A1 | 1/2002 | Fehn | |
| 2004/0146675 A1 * | 7/2004 | Hashimoto | B29C 49/22 |
| | | | 428/35.7 |
| 2004/0194663 A1 | 10/2004 | Li | |
| 2005/0011892 A1 * | 1/2005 | Nakajima | B32B 27/36 |
| | | | 220/62.22 |
| 2005/0142309 A1 | 6/2005 | Goto et al. | |
| 2005/0170113 A1 | 8/2005 | Hill | |
| 2005/0170114 A1 * | 8/2005 | Hill | B29C 49/071 |
| | | | 264/537 |
| 2005/0287323 A1 * | 12/2005 | Akiyama | B65D 1/0215 |
| | | | 264/40.7 |
| 2006/0029823 A1 | 2/2006 | Brown | |
| 2006/0156957 A1 | 7/2006 | Fuller | |
| 2006/0263554 A1 * | 11/2006 | Yamada | B32B 27/18 |
| | | | 428/212 |
| 2007/0228598 A1 * | 10/2007 | Akiyama | B29C 49/22 |
| | | | 264/171.1 |
| 2008/0017076 A1 | 1/2008 | Noguchi | |
| 2008/0047470 A1 | 2/2008 | Pfaff | |
| 2008/0193787 A1 * | 8/2008 | Dierickx | B65D 1/0215 |
| | | | 264/513 |
| 2008/0241447 A1 | 10/2008 | Shi | |
| 2008/0317989 A1 * | 12/2008 | Abe | B29C 45/1642 |
| | | | 428/36.9 |
| 2009/0233026 A1 * | 9/2009 | Akiyama | B29C 48/18 |
| | | | 264/209.1 |
| 2010/0028577 A1 | 2/2010 | Siegl | |
| 2010/0206784 A1 | 8/2010 | Weaver et al. | |
| 2010/0307633 A1 | 12/2010 | Dierickx | |
| 2011/0100857 A1 * | 5/2011 | Wang | B65D 65/16 |
| | | | 206/524.1 |
| 2012/0165422 A1 * | 6/2012 | Vernon | C08J 3/20 |
| | | | 524/502 |
| 2012/0171401 A1 | 7/2012 | Katou | |
| 2012/0256356 A1 | 10/2012 | Akiyama | |
| 2013/0069268 A1 * | 3/2013 | Liu | B29B 11/14 |
| | | | 264/75 |
| 2013/0273287 A1 | 10/2013 | Luo et al. | |
| 2013/0313217 A1 | 11/2013 | Yamamoto et al. | |
| 2014/0044904 A1 * | 2/2014 | De Belder | B32B 27/32 |
| | | | 428/323 |
| 2014/0054255 A1 | 2/2014 | Hosokoshiyama et al. | |
| 2014/0119813 A1 | 5/2014 | Moselage, III | |
| 2015/0079320 A1 * | 3/2015 | Katou | B32B 1/02 |
| | | | 428/35.7 |
| 2015/0105532 A1 | 4/2015 | Allen | |
| 2016/0017092 A1 | 1/2016 | Iwamoto et al. | |
| 2016/0368649 A1 * | 12/2016 | Eschenburg | B32B 1/00 |
| 2017/0021552 A1 | 1/2017 | Dygert | |
| 2017/0197351 A1 | 7/2017 | Chiba | |
| 2017/0204251 A1 | 7/2017 | Agerton et al. | |
| 2017/0259486 A1 | 9/2017 | Koerner | |
| 2018/0002071 A1 * | 1/2018 | Hosokoshiyama | B65D 1/0215 |
| 2019/0009483 A1 | 1/2019 | Meadows et al. | |
| 2019/0105805 A1 | 4/2019 | Dubuque | |
| 2019/0112091 A1 | 4/2019 | Neufarth et al. | |
| 2019/0143576 A1 | 5/2019 | Chiba et al. | |
| 2020/0024021 A1 | 1/2020 | Agerton | |
| 2020/0122873 A1 | 4/2020 | Agerton | |
| 2020/0171727 A1 * | 6/2020 | Witz | B29C 45/1684 |
| 2020/0282688 A1 | 9/2020 | Schur | |
| 2020/0324455 A1 | 10/2020 | Agerton | |
| 2020/0324456 A1 | 10/2020 | Mamak | |
| 2020/0399463 A1 * | 12/2020 | Wieloch | C08L 67/02 |
| 2021/0221551 A1 | 7/2021 | Neufarth et al. | |

(56) References Cited

U.S. PATENT DOCUMENTS

| | | |
|---|---|---|
| 2021/0269188 A1 | 9/2021 | Agerton et al. |
| 2022/0017254 A1 | 1/2022 | Tanchette |

FOREIGN PATENT DOCUMENTS

| | | |
|---|---|---|
| CN | 201484752 U | 5/2010 |
| CN | 102026793 A | 4/2011 |
| CN | 102498045 A | 6/2012 |
| CN | 102575076 A | 7/2012 |
| CN | 106573447 A | 4/2017 |
| CN | 107548352 A | 1/2018 |
| CN | 211732096 U | 10/2020 |
| DE | 202004018510 U1 | 9/2005 |
| DE | 102005022633 A1 | 11/2006 |
| DE | 102013011403 A1 | 1/2015 |
| EP | 0328014 A2 | 8/1989 |
| EP | 0354255 A1 | 2/1990 |
| EP | 1681239 A1 | 7/2006 |
| EP | 2231373 B1 | 7/2015 |
| EP | 2957514 A1 | 12/2015 |
| JP | S5381569 A | 7/1978 |
| JP | S57128520 A | 8/1982 |
| JP | S6294541 A | 5/1987 |
| JP | H0295631 A | 4/1990 |
| JP | H05042641 A | 2/1993 |
| JP | 06171638 A | 6/1994 |
| JP | H06255052 A | 9/1994 |
| JP | H07186190 A | 7/1995 |
| JP | H07205195 A | 8/1995 |
| JP | H08156202 A | 6/1996 |
| JP | 2970292 B2 | 11/1999 |
| JP | 2000264325 A | 9/2000 |
| JP | 3134376 B2 | 2/2001 |
| JP | 2002104362 A | 4/2002 |
| JP | 2004148616 A | 5/2004 |
| JP | 2004203906 A | 7/2004 |
| JP | 2005219760 A | 8/2005 |
| JP | 2005308567 A | 11/2005 |
| JP | 2006168250 A | 6/2006 |
| JP | 2006306470 A | 11/2006 |
| JP | 2006312485 A | 11/2006 |
| JP | 2007223628 A | 6/2007 |
| JP | 2007186190 A | 7/2007 |
| JP | 2007205195 A | 8/2007 |
| JP | 2008156202 A | 7/2008 |
| JP | 2008189314 A | 8/2008 |
| JP | 2008208288 A | 9/2008 |
| JP | 2009062059 A | 3/2009 |
| JP | 4674136 B2 | 1/2011 |
| JP | 5029879 B2 | 9/2012 |
| JP | 2013028137 A | 2/2013 |
| JP | 2015131438 A | 7/2015 |
| JP | 2015131492 A | 7/2015 |
| JP | 3207320 U | 10/2016 |
| JP | 2017036069 A | 2/2017 |
| JP | 2017128659 A | 7/2017 |
| JP | 2018039536 A | 3/2018 |
| JP | 2018058604 A | 4/2018 |
| JP | 6593187 B2 | 10/2019 |
| KR | 20010047311 A | 6/2001 |
| TW | 201704107 A | 2/2017 |
| TW | 201704108 A | 2/2017 |
| TW | 201706189 A | 2/2017 |
| WO | 2006066825 A2 | 6/2006 |
| WO | 2006127569 A2 | 11/2006 |
| WO | 2007065508 A2 | 6/2007 |
| WO | 2007066508 A1 | 6/2007 |
| WO | 2007098837 A1 | 9/2007 |
| WO | 2016031150 A1 | 3/2016 |
| WO | 2017134099 A1 | 8/2017 |
| WO | 2019133713 A1 | 7/2019 |
| WO | 2020081114 A1 | 4/2020 |

OTHER PUBLICATIONS

All final and non-final office actions for U.S. Appl. No. 16/158,719 (P&G Case 15306M).
All final and non-final office actions for U.S. Appl. No. 16/381,125 (P&G Case 15379M).
All final and non-final office actions for U.S. Appl. No. 16/845,283 (P&G Case 15511M).
All final and non-final office actions for U.S. Appl. No. 16/845,295 (P&G Case 15512M).
All Office Actions, U.S. Appl. No. 17/217,751.
All Office Actions, U.S. Appl. No. 17/226,203.
All Office Actions, U.S. Appl. No. 17/320,569.
All Office Actions, U.S. Appl. No. 16/158,841.
C-Mold Co-Injection, Chapter 20, Copyright 1996 Advanced CAE Technology, Inc.
The Preferential Heating process for PET flat or asymmetric containers on SBO Universal and SBO Compact blow molders, www.sidel.com, publication date unknown.
Unpublished U.S. Appl. No. 17/226,203, filed Apr. 9, 2021, to Marc Andrew Mamak et. al.
Fundamental Technology of Coating Material, published on Jun. 30, 2012, 12 pgs.

* cited by examiner

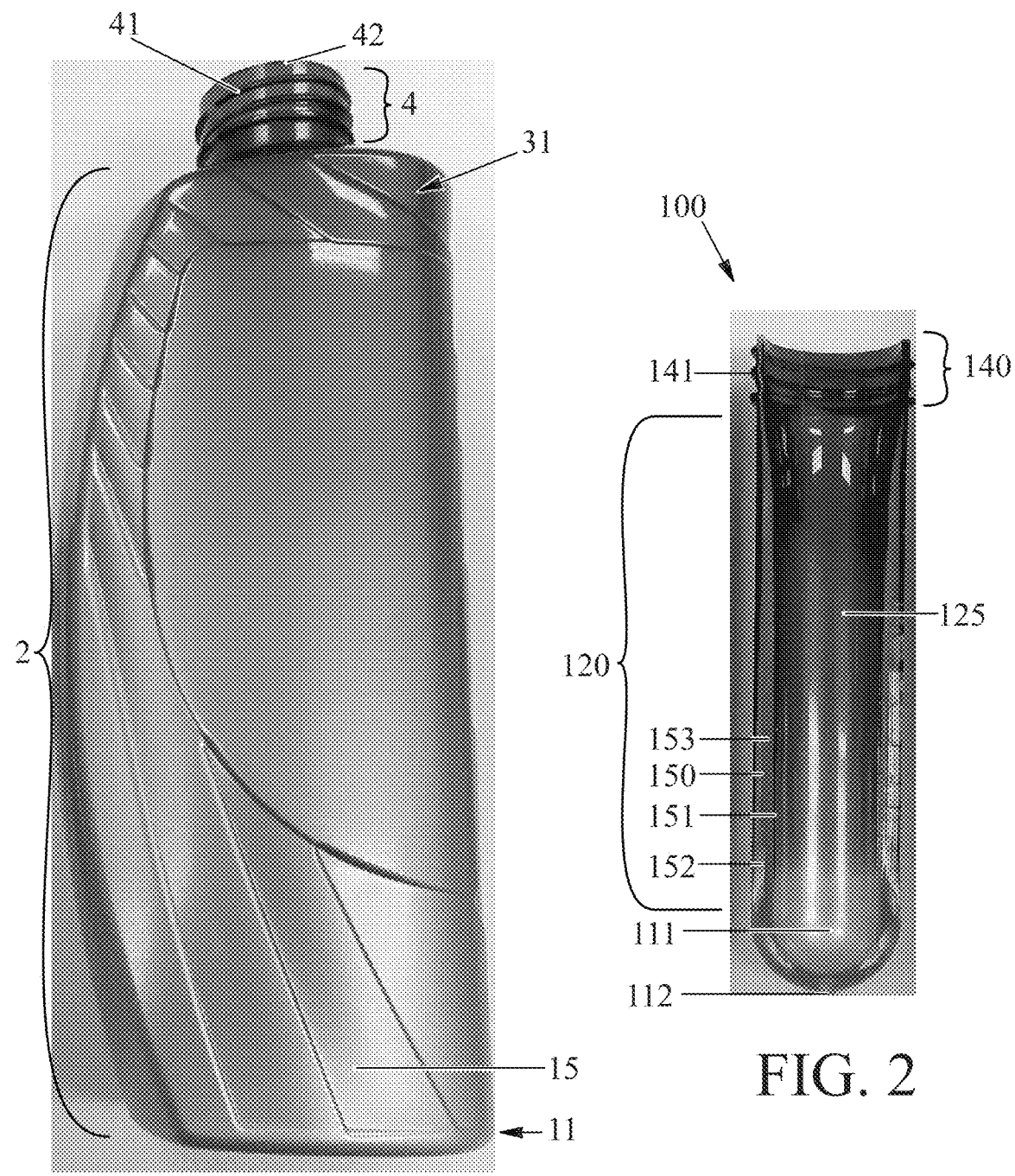

BLOW MOLDED MULTILAYER ARTICLE WITH COLOR GRADIENT

FIELD OF THE INVENTION

The invention is generally directed to blow molded articles with a color gradient, and more particularly to blow molded, multilayer articles having at least one layer that contains effect pigments and/or opacifying pigments that help to produce the color gradient and other visual effects. The invention relates also to preforms for making such articles.

BACKGROUND OF THE INVENTION

Consumers want to purchase articles, particularly hair and beauty products in blow molded containers, that grab their attention by having a unique and/or premium appearance at the store shelf and/or webpage/app. During use, it is important that the consumer continues to be impressed by not only the article's appearance, but the function, feel, and integrity of the article.

To make eye-catching articles that connotate luxury and quality, it can be desirable for the article to have a color gradient. It can be particularly attractive if the color gradient is across the entire article and where the surface of the article is glossy. Glossy articles can generally have a smooth outer surface that can enhance the degree of light reflected from that surface (i.e. specular reflectance is relatively high for a smoother surface).

The color gradient in combination with the effect pigments can give the article a lustrous, pearlescent, iridescent, shimmery, sparkly, and/or metallic effect. Effect pigments have angle dependent optical effects when dispersed within a medium such as a coating or plastic resin resulting from their platelet-like structure as well as their alignment within the medium. Additionally, it can be desirable for the article to have adequate opacity across the volume of the unit such that the fill line of the product remains hidden from the consumer.

Currently, some blow-molded articles with simple, non-angle dependent color gradients can be made by varying the thickness of a colored core. However, this approach lacks the ability to control opacity of the article across its full volume. Also, during use, these articles can be flimsy, and the layers may separate (delamination). Approaches to mitigate delamination include the incorporation of adhesives between the layers and/or compatibilizers within the layers. Articles made using this method also tend to use more plastic than standard blow molded articles.

Also, it can be expensive to incorporate effect pigments and/or opacifying pigments into large scale blow molded articles because the weight percent loading of pigment particles required to achieve the desired optical effect is difficult to afford within the context of high-volume disposable packaging. Once dispersed within a blow molded article, the articles generally have poor gloss and high haze, which diminishes the optical appearance benefits of the pigments. Without being bound by theory it is believed this is due to the unevenness of the external surface of the articles when effect pigment particles and/or opacifying pigment particles are present due to a proportion of the particles which will be exposed near or at the surface of the article.

One solution to increase the gloss is to produce a preform and resultant container wherein an inner layer comprises a pigment and the outer layer is transparent and may also include a colorant. These products are generally manufactured by a two-step method (i.e. method where the materials making up the various layers are introduced in sequence, such as, co-molding/overmolding where the various layers are molded one over the other in subsequent steps or two step injection where the material of an outer layer is injected first into the mold cavity and is subsequently followed by the material of an inner layer). However, we have observed that in certain cases such construction method can lead to poor mechanical resistance of the finished article so that the layers delaminate during use.

One way to create a color gradient with effect pigments and/or opacifying pigments is to apply (e.g. by painting or printing) the gradient onto the blow molded article. However, this process adds complexity and cost to the article manufacturing and is generally not sustainable in the mass production of blow molded articles. Also, containers made with this method are generally less durable, since the paint/print can scratch off during filling, transit, and use.

As such, there remains a need for a blow molded article with a color gradient by incorporating colorants, including pigments, in alternate materials wherein the delamination of the materials is mitigated. There is further a need for a blow molded article with a color gradient where the colorants are incorporated into the materials include dyes, pigments and combinations of dyes and pigments. There is further a need for a blow molded article with a color gradient where the colorants incorporated into the materials include at least one effect pigment and/or opacifying pigment. The article can have high opacity across its entire volume. The article can be resistant to delamination without any adhesives or compatibilizers.

SUMMARY OF THE INVENTION

A blow molded multilayer article comprising: a hollow body defined by a wall comprising an inner surface and an outer surface; and a neck extending from the body to an orifice; wherein at least a first portion of the wall comprises at least three layers comprising: two A-layers forming the outer surface and the inner surface of the wall and a B-layer located between the A-layers; wherein the A-layers are transparent and comprise a colored dye or pigment; wherein the B-layer comprises an effect pigment and/or an opacifying pigment; wherein the A-layers and B-layers comprise a thermoplastic resin; wherein the thickness of the A-layer varies; wherein the outer surface comprises an axial color gradient formed by constituents from the A-layer forming the outer surface.

BRIEF DESCRIPTION OF THE DRAWINGS

The patent or application file contains at least one photograph executed in color. Copies of this patent or patent application publication with color photograph(s) will be provided by the Office upon request and payment of the necessary fee.

While the specification concludes with claims particularly pointing out and distinctly claiming the subject matter of the present invention, it is believed that the invention can be more readily understood from the following description taken in connection with the accompanying drawings, in which:

FIG. 1 is a front view of an article with a color gradient and a glossy surface;

FIG. 2 is a cross-sectional view of a preform with a color gradient a glossy surface;

DETAILED DESCRIPTION OF THE INVENTION

Figure 3:
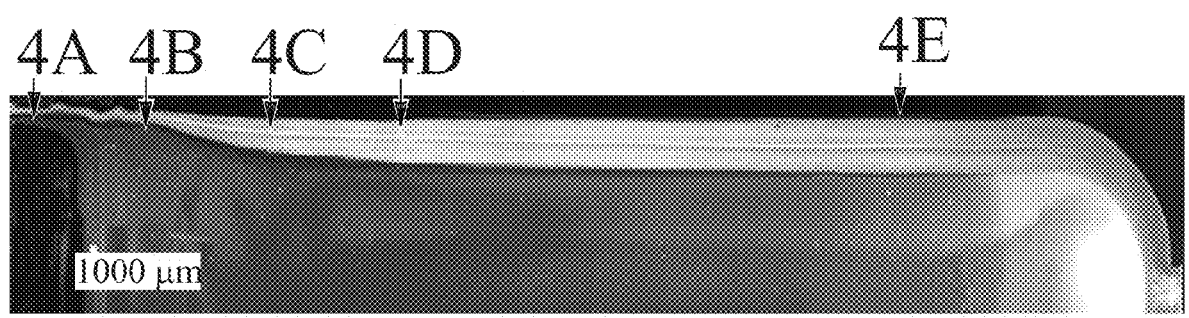
FIG. 3 is a photograph taken with microscopy of a cross-section of a preform.

While the specification concludes with claims particularly pointing out and distinctly claiming the invention, it is believed that the present disclosure will be better understood from the following description.

The eye-catching articles with a color gradient can be blow molded articles having a hollow body, such as containers and bottles, and can be made via a process of injection stretch blow molding (ISBM). FIG. 1 is a front view of an article 1, in this instance a bottle, with an axial color gradient and a glossy surface.

The blow molded articles can have walls defining the hollow body of the article. The walls can include multiple layers that are formed without adhesives by ISBM. The walls can include A-layers, which can be transparent and colored, and B-layers, which can include the opacifying or effect pigments. Article 1 can appear opaque across the entire volume since the wall contains at least one layer with an opacifying pigments and/or effect pigment across the entire volume.

The axial color gradient can be formed by the ISBM process. In the bottle of FIG. 1, the axial color gradient extends across body 2, from shoulder 31 to base 11 and body 2 can have a glossy outer surface. The glossy outer surface can appear metallic and/or sparkly because pigments can reside in the B-layer that is between A-layers. The A-layer forms the outer surface for much of the article and the B-layer can be seen through the transparent A-layer, which creates an appearance with gloss and depth. In FIG. 1, the axial color gradient is gradual without obvious transition points that are visible (e.g. transition lines) on the outer surface of the article. In this example, the outer surface of the wall is substantially an A-layer, which can be transparent and colored. In some examples, the outer surface can be formed by both an A-layer and a B-layer and the outer surface of the wall (which excludes the shoulder and base) can contain at least 80% A-layer, alternatively at least 85% A-layer, alternatively at least 90% A-layer, alternatively at least 95% A-layer, and alternatively at least 97% A-layer. In another example, the A-layer can be colorless.

In FIG. 1, the B-layer, which can contain an effect pigment, can generally be located between the transparent A-layers. In FIG. 1, the B-layer is opaque and contributes to the high degree of opacity across the bottle.

Interestingly, where the location where the A-layer tapers off, the transition spot, and/or the forking can vary, even when the preforms and bottles are made according to the same manufacturing process. This results in each bottle looking slightly different and each bottle is unique, which can have a handcrafted premium look that is eye-catching and appealing to consumers.

In another example, the B-layer, which contains the effect and/or opacifying pigment, can generally be the outermost layer of the wall and can form an axial color gradient that can extend across the entire article. In this example, the outer surface of the article can be pearlescent, which can have a matte finish along with a silky, soft-touch feel. This can be caused by effect pigments and/or opacifying pigments residing at or near the outer surface of the bottle In another example, the color gradient can extend across a portion of the article.

The articles made by the blow molding process described herein and each article can be unique. For instance, the gradient is generally not the same on any of the articles. This uniqueness contributes to an eye-catching, premium look of the articles.

As used herein, "article" refers to an individual blow molded hollow object for consumer usage, e.g. a container suitable for containing compositions. Non-limiting examples can include a bottle, a jar, a cup, a cap, a vial, a tottle, and the like. The article can be used in storage, packaging, transport/shipping, and/or for dispensing compositions container therein. Non-limiting volumes containable within the container are from about 10 mL to about 1000 mL, about 100 ml to about 900 mL, from about 200 mL to about 860 mL, from about 260 mL to about 760 mL, from about 280 mL to about 720 mL, from about 350 mL to about 500 mL. Alternatively, the container can have a volume up to 5 L or up to 20 L.

The compositions contained in the article may be any of a variety of compositions and including detergents (such as laundry or dishwashing detergents), fabric softeners and fragrance enhancers (such as Downy® Fresh Protect) food products including but not limited to liquid beverages and snacks, paper products (e.g., tissues, wipes), beauty care compositions (e.g., cosmetics, lotions, shampoos, conditioners, hair styling, deodorants and antiperspirants, and personal cleansing including washing, cleaning, cleansing, and/ or exfoliating of the skin, including the face, hands, scalp, and body), oral care products (e.g., tooth paste, mouth wash, dental floss), medicines (antipyretics, analgesics, nasal decongestants, antihistamines, cough suppressants, supplements, anti-diarrheal, proton pump inhibitor and other heartburn remedies, anti-nausea, etc.) and the like. The compositions can include many forms, non-limiting examples of forms can include liquids, gels, powders, beads, solid bars, pacs (e.g. Tide PODS®), flakes, paste, tablets, capsules, ointments, filaments, fibers, and/or sheets (including paper sheets like toilet paper, facial tissues, and wipes).

The article can be a bottle for holding a product, for instance a liquid product like shampoo and/or conditioner.

As used herein, the term "blow molding" refers to a manufacturing process by which hollow plastic articles containing cavities, suitable to accommodate compositions are formed. Generally, there are three main types of blow molding: extrusion blow molding (EBM), injection blow molding (IBM) and injection stretch blow molding (ISBM).

As used herein, the term "color" includes any color, such as, e.g., white, black, red, orange, yellow, green, blue, violet, brown, and/or any other color, or declinations thereof.

As used herein, the term "color gradient" refers to a colored region having a first region and a second region, wherein the colored region includes any continuous function in L*a*b* color space. The gradient can be a continuous function of any or all of the L*, a* and/or b* values versus measurement location across or along the samples.

As used herein, "effect pigment" means one of two main classes of pigments" "metal effect pigments" and "special effect pigments." Metal effect pigments consist of only metallic particles. They create a metal-like luster by reflection of light at the surface of the metal platelets when having parallel alignment in their application system. Special effect pigments include all other platelet-like effect pigments which cannot be classified as "metal effect pigments". These are typically based on a substrate which has platelet shaped crystals (or particles) such as mica, (natural or synthetic) borosilicate glass, alumina flakes, silica flakes. These platelet shaped particles are typically coated with metal oxides.

As used herein, "opaque" means that layer has total luminous transmittance of less than 50%. The total luminous transmittance is measured in accordance with ASTM D1003.

Special effect pigments can include "pearlescent pigments" (also referred to as "pearl luster pigments"). Also suitable are "interference pigments" or "nacreous pigments" are based on the use of a laminar substrate such as mica or glass flake which has been coated with one or more dielectric layers including metal oxides, silicon dioxide, aluminum oxide and other oxides. These pigments can exhibit pearl-like luster as a result of reflection and refraction of light and depending on the thickness of the metal oxide layer, they can also exhibit interference color effects. Non-limiting examples of pearlescent pigments can include titanium dioxide-coated mica, iron oxide-coated mica, and combinations thereof.

Effect pigments, including pearlescent pigments are marketed as such by suppliers including Merck KGaA, Performance Materials and BASF.

As used herein, "preform" is a unit that has been subjected to preliminary, usually incomplete, shaping or molding, and is normally further processed to form an article. The preform is usually approximately "test-tube" shaped.

As used herein, "substantially free" means less than 3%, alternatively less than 2%, alternatively less than 1%, alternatively less than 0.5%, alternatively less than 0.25%, alternatively less than 0.1%, alternatively less than 0.05%, alternatively less than 0.01%, alternatively less than 0.001%, and/or alternatively free of. As used herein, "free of" means 0%.

As used herein, "transparent" means that layer has total luminous transmittance of 50% or more and reflected haze of less than 5 haze units. The total luminous transmittance is measured in accordance with ASTM D1003, the reflected haze is measured in accordance with ASTM E430.

As used herein, the terms "include," "includes," and "including," are meant to be non-limiting and are understood to mean "comprise," "comprises," and "comprising," respectively.

All percentages, parts and ratios are based upon the total weight of the compositions of the present invention, unless otherwise specified. All such weights as they pertain to listed ingredients are based on the active level and, therefore, do not include carriers or by-products that may be included in commercially available materials.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Where amount ranges are given, these are to be understood as being the total amount of said ingredient in the composition, or where more than one species fall within the scope of the ingredient definition, the total amount of all ingredients fitting that definition, in the composition. For example, if the composition comprises from 1% to 5% fatty alcohol, then a composition comprising 2% stearyl alcohol and 1% cetyl alcohol and no other fatty alcohol, would fall within this scope.

FIG. 1 is a front view of an article 1 with a color gradient, including an axial color gradient. The article 1 has a body 2 and a neck 4 having screw thread notches 41 on the outer surface and orifice 42, an opening leading to the hollow body of the article. In other examples, the neck can be a lug neck or a snap bead neck finish. The body has base 11 at the lower end and shoulder 31 at the upper end. In the example in FIG. 1, the color gradient is visible on the outer surface of body 2 and extends across outer surface. The color gradient is darker at the areas near the shoulder than at the areas near the base. The outer surface can be glossy.

FIG. 2 is a cross-sectional view of a preform 100 with a color gradient. The preform has a cylindrical body 120 closed at its lower end by a semi-spherical endcap 111 having a gate imprint 112 at the bottom center and a cylindrical neck 140 having screw thread notches 141 on the outer peripheral wall and having a brim-like neck ring at the boundary between the neck 140 and the body 120.

In FIG. 2 the cross-sectional view also shows hollow body 125 defined by wall 150 of the preform. Wall 150 has an inner surface 151 and an outer surface 152. In at least a portion of the neck and body of the preform, wall 150 can have multiple layers. In FIG. 2, wall 150 has at least two A-layers (e.g. 151 and 152) and one B-layer (e.g. 153) across the vast majority of body 120 and neck 140. As can be seen in FIG. 2, the A-layers form the vast majority of inner surface 151 and outer surface 152. The A-layers are thickest near the top/neck 141 of the preform and taper as they extend down the preform body 120 towards endcap 111, which creates the color gradient.

In FIG. 2, the A-layer is visible on the outer surface almost the entire way to the base. However, there is still a portion of the body where the B-layer comprises the outer surface and will comprise the outer surface of the blown article, as shown in FIG. 1 at transition spot 15. Also, the inventors have reason to believe that the A-layer forks at or near the transition spot and can otherwise be irregular, instead of a smoothly and uniformly tapering off. The forks can occur due to the manufacturing process, where the A-layer is often or can be spliced into additional forks that appear as thin streams in the cross section of the wall. The forks may only be visible under magnification and in some examples the forks can be visually perceptible to a viewer without magnification.

In some examples, the A-layer can extend all the way to endcap 111. In these examples, the color gradient can extend across the entire length of the article and the entire article can be glossy. Also, the forking and visual irregularities, like the transition spot, can be at the base and not visible to the consumer when the product is displayed on a store shelf, website, or app.

In some examples, the A-layer and B-layer are reversed, and the B-layer forms a portion of the outer surface and in some examples forms the outer surface from the neck to, at, or near the base the base. In this example, the B-layer tapers and forms the color gradient. In this example, the container can be pearlescent instead of glossy. To form this bottle, the A-layer and the B-layer can also be reversed in the preform.

In yet another example, the A-layer or the B-layer, whichever one forms the color gradient, is widest at the base and tapers towards the neck or at the neck, which can result in a final article where the top of the color gradient (e.g. near the shoulder) is lighter than the bottom of the gradient (e.g. near the base).

The multilayer structure can be formed without adhesives (or substantially free of adhesives) by ISBM.

The B-layers can include an effect pigment and/or an opacifying pigment.

The A-layer can be transparent and can include a pigment or soluble dye. The pigment or dye can be colored. Alternatively, the A-layer can be colorless. The A-layer can be free of or substantially free of pigments and/or particles having their largest dimension greater than about 150 nm or between about 150 nm and 5000 nm.

Alternatively, the A-layer can include a pigment, the A-layer can still be transparent because the pigments can be in a matrix where the difference between the refractive index of the pigment (which depends on wavelength) and that of the matrix is low, and when the particle size of the pigment is below that which Mie scattering occurs (typically a largest particle dimension of about 100 nm or less). The A-layer can contain opaque absorption pigments and still be transparent, if the content of the layer in opaque absorption pigments is sufficiently small.

In the final article, the B-layer can contain from about 0.01% to about 10%, alternatively from about 0.5% to about 7.5%, and alternatively from about 1% to about 5%, by weight of the B-layer, pigment.

The average wall thickness of the final article can be from about 200 μm to about 5 mm, alternatively from about 250 μm to about 2.5 mm, alternatively from about 300 μm to about 2 mm, alternatively from about 350 μm to about 1.5 mm, and alternatively from about 375 μm to about 1.4 mm. The average wall thickness can be determined using the Local Wall Thickness method, described hereafter. The average wall thickness can vary by less than 20% across the volume, alternatively less than 15%, alternatively less than 10%, and alternatively less than 10%.

The average local wall thickness can be substantially uniform across the body of the article, even though the ratio of the thickness of the B-layer to the thickness of the A-layer can vary across the length of the article and the number of layers and amount of forking varies. The ratio of the thickness of the A-layer to the thickness of the B-layer at a point along the wall of the body near the neck can be from about 0.4 to about 2.5, and alternatively from about 1 to about 2. The ratio of the thickness of the A-layer to the thickness of the B-layer at a point along the wall of the body near the neck can be greater than 1:1, alternatively greater than 3:2, and alternatively greater than 2:1. The ratio of the thickness of the B-layer to the thickness of the A-layer at the wall of the body near the base can be from about 2 to about 25, alternatively from about 5 to about 25, alternatively from about 10 to about 25, and alternatively from about 15 to about 25. The ratio of the thickness of the A-layer to the thickness of the B-layer at the wall of the body near the base can be less than 1:1, alternatively less than 3:5, and alternatively less than 1:5.

It has been found that in articles according to the invention, the effect pigment particles in the B-layer can be predominantly oriented so that their face is parallel to the surface of the article. Without being bound by theory, it is believed that the ratio of oriented versus mal-oriented platelets is higher may be due to a combination of factors including the fact that the interface between each stream experiences higher shear versus similar locations in a monolayer article where the effect pigments are dispersed in the entire wall of the article which is thicker (at parity mechanical strength of the article) than the B-layer sandwiched between A-layers. In monolayer articles the particles are less concentrated in the region of high shear thus they have more free space to rotate 360° during the injection molding process while, in a multilayer article, the B-layer, is much thinner as it only represents a portion of the total thickness of the article's wall, so that the injection molding and stretching steps provide for more optimum orientation of a larger percentage of platelet like pigment particles.

It has further been found that the tendency for the platelet effect pigments to orient parallel to the surface of the article persist even when the article is irregularly shaped. As such, the shape of the article can be further used to modify the visual effects generated by the article from the point of view of a person viewing the article, depending on the orientation of the article when being viewed.

The article can include a color gradient extending along at least a portion of the length of an article and in some examples along the entire length of the article. The color gradient can be visually perceptible to a viewer who views the exterior surface of the article. The color gradient can extend from a dark intensity to a lighter intensity, or vice versa. In addition, or alternatively, the article can include more than one color gradient along the length of the article, such as, for example, a dark to light gradient followed by a light to dark gradient, followed by an additional dark to light gradient, and so on. The color gradient can extend from a first color to a second color. In one example the color gradient extends from white to a second color or vice versa. In another example, the color gradient is dark blue and transitions to a lighter blue or a teal color.

The color gradient can be "visually perceptible" to a viewer. By "visually perceptible" is meant that a human viewer can visually discern the gradient with the unaided eye (excepting standard corrective lenses adapted to compensate for near-sightedness, farsightedness, or stigmatism, or other corrected vision) in lighting at least equal to the illumination of a standard 100-watt incandescent white light bulb at a distance of 0.25 meter.

The gradient can include any suitable color, such as, for example, white, black, red, orange, yellow, green, blue, violet, brown, silver, gold, and/or any other color, or declinations thereof. In certain embodiments, the gradient can be a gradient from blue to white, darker blue to lighter blue, pink to white, darker pink to lighter pink, purple to white, darker purple to lighter purple, red to white, darker red to lighter red, gold to white, lighter gold to darker gold, yellow to white, lighter yellow to darker yellow, green to white, lighter green to darker green, blue to purple, pink to purple, or any other suitable configurations.

A color gradient may be identified by ΔE values along the length or the gradient, which are mathematically expressed by the equation:

$$\Delta E^* = [(L^*_X - L^*_Y)^2 + (a^*_X - a^*_Y)^2 + (b^*_X - b^*_Y)^2]^{1/2}$$

'X' represents a first measuring point and "Y" represents a second measuring point along the gradient.

The color scale values utilized herein to define the gradient are the CIE LAB scale. Measurements are made with a Hunter Color reflectance meter. A complete technical description of the system can be found in an article by R. S. Hunter, 'photoelectric color difference Meter', Journal of the Optical Society of America, Vol. 48, pp. 985-95, 1958. Devices specially designed for the measurement of color on the Hunter scales are described in U.S. Pat. No. 3,003,388 to Hunter et al., issued Oct. 10, 1961. In general, Hunter Color "L" scale values are units of light reflectance measurement, and the higher the value is, the lighter the color is since a lighter colored material reflects more light. In particular, in the Hunter Color system the "L" scale contains 100 equal units of division. Absolute black is at the bottom of the scale (L=0) and absolute white is at the top of the scale (L=100). Thus, in measuring Hunter Color values of the articles according to the present invention, the lower the "L" scale value, the darker the material. The articles herein might be of any color provided that the L Hunter value defined herein is met. When a color is defined according to this system L* represents lightness (0=black, 100=white), a* and b* independently each represent a two-color axis, a* representing the axis red/green (+a=red, −a=green), while b* represents the axis yellow/blue (+b=yellow, −b=blue).

When measured across the color gradient, for instance when you measure at the top of the gradient, near the center of the gradient, and at the bottom of the gradient the L*, a*, and b* values will change. In some instances, the value will increase and in other instances the value will decrease, depending on the color.

The color gradient can be provided at any suitable location on the article. The color gradient can extend from the base to the shoulder of the article or from the base to the neck of the article. Alternatively, the color gradient can extend along only a portion of the length of the article. Alternatively, a series of color gradients can be provided along the length of the article. Such gradients can be contiguous or separate. In addition, the color gradient can extend around any suitable amount of the perimeter of the article, such as, e.g., a portion of the perimeter of the article or substantially the entire circumference of the article.

The articles can appear opaque, as visually perceptible by a person. Although the article can appear opaque, the opacity can vary across the bottle as measured by the Opacity Test Method, described hereafter.

The % opacity can be from about 55% to about 100%, alternatively from about 60% to about 98%, and alternatively from about 65% to about 97%. The % opacity can be from about 70% to about 100%, alternatively from about 72% to about 99%, and alternatively from about 74% to about 97%, and alternatively from about 80% to about 96%. The % opacity can be greater than 50%, greater than 60%, greater than 70%, greater than 75%, greater than 80%, greater than 85%, and greater than 90%. Opacity is measured according to the Opacity Test Method, described hereafter.

The % change in opacity from the opaquest area to the least opaque area can be less than 30%, alternatively less than 25%, alternatively less than 22%, and alternatively less than 20%. The opacity can vary across the gradient, according to the Opacity Test Method. Alternatively, the opacity can be substantially the same across the length and/or width article.

The article can have a glossy outer surface. The change in gloss 20° across the length and/or width of the outer surface of the body can be substantially the same. The gloss can vary less than 20 GUs across the length and/or width of the outer surface of the body, alternatively less than 15 GUs, alternatively less than 10 GUs, alternatively less than 5 GUs, and/or alternatively less than 2 GUs.

The article can have a location on the outer surface of the body with a gloss 20° of greater than or equal to 65 GUs, greater than or equal to 68 GUs, greater than or equal to 70 GUs, greater than or equal to 71 GUs, greater than or equal to 73 GUs, and/or greater than or equal to 75 GUs. The article can have a location on the outer surface of the body with a gloss 20° of from about 65 to about 110 GUs, from about 68 GUs to about 100 GUs, from about 69 to about 95 GUs, from about 70 GUs to about 90 GUs, and/or 75 GUs to about 85 GUs.

Alternatively, the article can have a matte/pearlescent outer surface that can have a location on the outer surface of the body with a gloss 20° of less than or equal to 15, less than or equal to 12, less than or equal to 10, less than or equal to 8, less than or equal to 7, and/or less than or equal to 6. The article can have a matte/pearlescent outer surface that can have a location with a gloss 20° from about 2 to about 13, from about 4 to about 9, and/or from about 5 to about 8.

The gloss 20° can be measured according to the Gloss 20° Method, described hereafter. The highest GU and lowest GU can be determined as follows: the sample panel is removed from the article as described hereafter. Gloss 20° are made every 10 mm along the length of the sample panel. The change is calculated by subtracting the lowest value measured from the highest value measured.

The article can have a body with an outer surface with a surface roughness. The change in surface roughness across the length and/or width of the outer surface of the body can be substantially the same. The surface roughness can very less than 20 μin (0.508 μm), alternatively less than 18 μin (0.4572 μm), alternatively less than 10 μin (0.254 μm), alternatively less than 5 μin (0.127 μm), less than 3 μin (0.0762), and/or less than 2 μin (0.0508).

The outer surface of the body can have a location with a surface roughness of less than 8 μin (0.2032 μm), 5 μin (0.127 μm), less than 3 μin (0.0762), and/or less than 2 μin (0.0508). The surface of the article can have a location with a surface roughness from about 0.5 μin (0.0127 μm) to about 4 μin (0.1016 μm), from about 0.75 μin (0.01905 μm) to about 3.5 μin (0.0889 μm), from about 1 μin (0.0254 μm) to about 3.25 μin (0.08255 μm), from about 1 μin (0.0254 μm) to about 3 μin (0.0762 μm), and/or from about 1.25 μin (0.03175 μm) to about 3 μin (0.0762 μm).

The outer surface of the body can have a location with a surface roughness greater than 25 μin (0.635 μm), greater than 28 μin (0.7112 μm), greater than 30 μin (0.762 μm), greater than 31 μin (0.7874 μm), and/or greater than 32 μin (0.8128 μm). The surface of the article can have a location with a surface roughness from about 20 μin (0.508 μm) to about 42 μin (1.0668 μm), from about 25 μin (0.635 μm) to about 40 μin (1.016 μm), from about 28 μin (0.7112 μm) to about 38 μin (0.9652 μm), and/or from about 30 μin (0.762 μm) to about 36 μin (0.9144 μm).

The roughness can be measured according to the Surface Roughness Measurement Method, described hereafter. The highest surface roughness and lowest surface roughness can be determined as follows: the sample panel is removed from the article as described hereafter. Surface roughness measurements are made every 10 mm along the length of the sample panel. The change is calculated by subtracting the lowest value measured from the highest value measured.

Furthermore, the articles described herein are less susceptible to delamination as compared to other articles, including monolayer and multilayer articles. Delamination is a constant problem in manufacturing blow molded multilayer hollow articles, such as bottles and containers. Delamination can occur immediately or over time due to the mechanical handling of the container, to thermal stress or mechanical stress. It manifests typically as bubbles (which is actually the separation of the two layers at the interface which can see by a bubblelike appearance) on the container surface but can also be at the origin of container failure. Without being bound by theory, we believe that the parallel flow co-injection, due to a prolonged contact of the materials of the various layers still in molten or partially molten state, leads to the formation of an interface region between the layers wherein the layers are slightly interpenetrated. The interface region generates a good adhesion between the layers and thus makes it much more difficult to separate them. Surprisingly it has also been found that multilayer articles according to the invention have an improved resistance to delamination not only with respect to articles obtained by blow molding of preforms made using step flow co-injection or overmolding, but even with respect to articles obtained from monolayer preforms. In other words, the interface layer appears to further strengthen the article wall with respect to a monolayer execution. Delamination resistance is evaluated measuring the Critical Normal Load, as described hereafter. A higher Critical Normal Load indicates a higher delamination resistance.

The articles can have a critical normal load of greater than or equal to 90 N, greater than or equal to 95 N, greater than or equal to 100 N, greater than or equal to 104 N, greater than or equal to 105 N, greater than or equal to 110 N, and/or greater than or equal to 120 N. The articles can have a critical normal load of from about 90 N to about 170 N, alternatively from about 95 N to about 160 N, alternatively from about 100 N to about 155 N, and alternatively from about 104 N to about 145 N. The critical normal load can be measured by the Critical Normal Load, using the method described hereafter.

In one example, the A-layers and B-layers both contain PET and can have a critical normal load of greater than 100 N. However, PET/PEN, PET/COC (Cyclic olefin copolymer), PET/Nylon, PET/recycled PET or PET/LCP can have lower normal loads. For instance, the normal load of these examples can be greater than 20 N, greater than 30 N. and/or greater than 40 N. Alternatively, the normal load of these examples can be from about 10 N to about 110 N, from about 20 N to about 80 N, from about 30 N to about 70 N, and alternatively, from about 40 N to about 60 N.

Delamination resistance is evaluated measuring the Critical Normal Load, using the method described hereafter. A higher Critical Normal Load indicates a higher delamination resistance.

Articles and preforms according to the invention are typically made from thermoplastic materials, typically comprising thermoplastic resins.

The article may comprise more than 50% wt., preferably more than 70% wt., more preferably more than 80% wt, even more preferably more than 90% wt. of a thermoplastic resin, selected from the group consisting of polyethylene terephthalate (PET), polyethylene terephthalate glycol (PETG), polystyrene (PS), polycarbonate (PC), polyvinyl-chloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP), polymethylpentene (PMP), liquid crystalline polymer (LCP), cyclic olefin copolymer (COC), and a combination thereof. The thermoplastic resin is selected from the group consisting of PET, HDPE, LDPE, PP, PVC, PETG, PEN, PS, and a combination thereof. In one example, the thermoplastic resin can be PET.

Recycled thermoplastic materials may also be used, e.g., post-consumer recycled polyethylene terephthalate (PCR-PET); post-industrial recycled polyethylene terephthalate (PIRPET); regrind polyethylene terephthalate.

The thermoplastic materials described herein may be formed by using a combination of monomers derived from renewable resources and monomers derived from non-renewable (e.g., petroleum) resources. For example, the thermoplastic resin may comprise polymers made from bio-derived monomers in whole, or comprise polymers partly made from bio-derived monomers and partly made from petroleum-derived monomers.

The thermoplastic resin used herein could have relatively narrow weight distribution, e.g., metallocene PE polymerized by using metallocene catalysts. These materials can improve glossiness, and thus in the metallocene thermoplastic execution, the formed article has further improved glossiness. Metallocene thermoplastic materials can, however, be more expensive than commodity materials. Therefore, in an alternative embodiment, the article is substantially free of the expensive metallocene thermoplastic materials.

The A-layers and B-layers can be based on the same type of thermoplastic resin (e.g. PET), this can allow a better interpenetration of the layers at the interface due to their chemical compatibility and a more robust wall. For "based on the same type of resin" it is meant that the A-layers and B-layers can contain at least 50%, at least 70%, at least 90%, and/or at least 95% of the same type of resin. For "same type" of resin it is intended resin from the same chemical class i.e. PET is considered a single chemical class. For example, two different PET resins with different molecular weight are considered to be of the same type. However, one PET and one PP resin are NOT considered of the same type. Different polyesters are also not considered of the same type.

The A-layers and B-layers may be formed by the same thermoplastic resin (e.g. PET) and may be different only for the type of colorants and pigments (including effect pigments and/or colored pigments) added.

The articles can comprise one or more sub-layers with various functionalities. For instance, an article may have a barrier material sub-layer or a recycled material sub-layer between an outer thermoplastic layer and an inner thermoplastic layer. Such layered containers can be made from multiple layer preforms according to common technologies used in the thermoplastic manufacturing field. Since barrier material sub-layers and recycled material sublayers can be used in the A-layers (particularly when they do not impact transparency of the A-layers) or B-layer or an additional C-layer.

The article can contain, in any of its layers as long as the required properties of the layer are maintained, additives typically in an amount of from about 0.0001% to about 9%, from about 0.001% to about 5%, and/or from about 0.01% to about 1%, by weight of the article. Non-limiting examples of the additives can include filler, cure agent, anti-statics, lubricant, UV stabilizer, anti-oxidant, anti-block agent, catalyst stabilizer, nucleating agent, and a combination thereof.

Additional gradients and/or visual effects can be created. For example, the A-layer or the B-layer can contain black and/or colored absorption pigments.

The A-layer can also include effect pigments, including effect pigments that are small enough and/or a small enough quantity so the A-layer still appears transparent or partially transparent. For instance, the A-layer can contain a relatively small content of effect pigment having small particle size or an even smaller content of effect pigment having large particles (e.g. to produce a sparkle effect).

The B-Layer can contain opacifying pigments (in addition to or instead of effect pigments). Opacifying pigments can include opacifiers, opaque absorption pigments, and combinations thereof.

Non-limiting examples of opacifiers can include titanium dioxide, calcium carbonate, silica, mica, clays, minerals and combinations thereof. Opacifiers can be any domain/particle with suitably different refractive index from the Thermoplastic Materials (e.g. PET, which can include poly(methyl methacrylate), silicone, liquid crystalline polymer (LCP), polymethylpentene (PMP), air, gases, etc.). Additionally, opacifiers can have the appearance of being white due to scattering of light or black due to absorption of light as well as shades in between as long as they block the majority of light from being transmitted to the layer underneath. Non-limiting examples of black opacifying pigments include carbon black and organic black pigments such as Paliogen® Black L 0086 (BASF).

Opaque absorption pigments can include particles that provide color and opacity to the material in which they are present. Opaque absorption pigments can be inorgainic or organic particulate materials. All absorption pigments can be opaque if their average particle size is sufficiently large, typically larger than 100 nm, alternatively larger than 500 nm, alternatively larger than 1 micrometer, and alternatively larger than 5 micrometers. Absorption pigments can be organic pigments and/or inorganic pigments. Non-limiting examples of organic absorption pigments can include azo and diazo pigments such as azo and diazo lake, Hansas, benzimidazolones, diarylides, pyrazolones, yellows and reds; polycyclic pigments such as phthalocyanines, quinacridones, perylenes, perinones, dioxazines, anthraquinones, isoindolins, thioindigo, diaryl or quinophthalone pigment, Aniline Black, and combinations thereof. Non-limiting examples of inorganic pigments can include titanium yellow, iron oxide, ultramarine blue, cobalt blue, chromic oxide green, Lead Yellow, cadmium yellow and cadmium red, carbon black pigments, and combinations thereof. The organic and inorganic pigments can be used singly or in combination.

Controlling the layer arrangement and the components in the A and B-layers can help to create a unique color profile and transparency to achieve different visual effects, ultimately creating an eye-catching premium appearance. For instance, the A-layers can be transparent and colored, and the B-layer can have silver pearl effect pigment, which can result in a gradient between a matte silver pearl appearance and glossy colored pearl. Alternatively, the A-layers can be opaque and black and combined with B-layers, having an effect pigment which generates an interference color, a gradient blow molded article can be achieved with a gradient from black to intense interference color.

The A-Layers and B-layers can comprise similar resins such as identical grades of PET, dissimilar grades of PET, or virgin PET/recycled PET (rPET). The A-Layers and B-Layers can also comprise different resins which can alternate within the article such as PET/cyclic olefin copolymer, PET/PEN, or PET/LCP. The resin pair is chosen to have optimal properties such as appearance, mechanical, and gas and/or vapor barrier.

The articles can be made according the ISBM process described herein. Articles made using ISBM process (as well as their respective preforms made via injection molding) can be distinguished from similar articles made using different process e.g. extrusion blow molding, for the presence of a gate mark, i.e. a small raised dot which indicates the "gate" where the injection took place. Typically, in the case of container and bottles, the "gate mark" is present at the bottom of the article.

The ISBM process starts with making a preform. In ISBM, the preform can be made by co-injection molding. Here, as the material of the outer layer flows into the mold cavity, the material next to the core and cavity walls freezes and material continues to flow down a center channel. When the material of the Stream-a (which comprises the transparent and/or translucent material in a thermoplastic resin) enters, it has a flowrate exceeding that of Stream-b (that forms the opaque B layer(s)) causing the Stream-a to push past the initial flow front. This Stream-a now leads in the injection process whereby it becomes the new outer layer within the same mold cavity and as it flows ahead the injection fill rate (velocity) is increased allowing it to gradually thicken and continues to solidify on the walls producing the outer layer. This effectively creates a preform part with two different streams solidified at the outer surface. The preform has a wall with varying number of layers dependent on processing conditions and which material is resulting in the outer layers.

Here, the unique visual appearance of the article can be achieved by making significant modifications to the standard process described above and the preform can be made as follows: First, the preforms can be made using the parallel flow co-injection method, where the injection of the streams are initiated within 5 seconds of each other.

The injection flow of the materials typically occurs as follows: The initial injection of Stream-a (containing molten A-layers) is started nearly simultaneously and/or simultaneously with the injection of Stream-b (containing molten B-layers). If a delay is present it can be from about 0.01-2 seconds. In some examples, Stream-a will be started before and/or nearly simultaneously with stream-b. At the desired time and after the streams are inserted in the preform mold, Stream-a is accelerated to a flowrate that is faster than the flowrate of Stream-b. This results in Stream-a blowing through Stream-b and in Stream-a flowing to the outside of Stream-b. Thus, Stream-a gradually forms the outside surface of the preform, bringing the A-layer material to the outside of the part and creating the color gradient. The resultant appearance depends on the material being run in Stream-a.

There can be forks in the A-layer and/or B-layer. These forks are due to the formation of thread-like flows which form by the stream(s) as it progresses in the viscous environment. These flows do not follow typical thread-like breakup as seen in typical fluids. The process is characterized by the elongation of the fluid mass forming thin, thread-like regions between larger nodules of viscous fluid. The thread-like regions would typically continue to thin until they break, forming individual droplets of fluid.

An example of a fork is a single flow of Stream-a which tapers (becomes thinner) axially along the article and can split to form multiple flows consisting mainly of Stream-b. Likewise, the flow of Stream-b can taper in an opposite manner to Stream-a and the flow can be split into multiple flows. The ability to fork either or both Stream-a and b can control the appearance and surface roughness of the article in a gradual manner.

The desired time can be controlled depending on the desired visual effect. Of course, the operator may choose to start with Stream-a leading in the beginning and later accelerating Stream-b for a different visual effect. In any case, the timing of the stream acceleration will determine the visual effect, i.e. whether the neck, base, or body or portions thereof of the article will have the pigments on the outer surface.

It has been found that, during the production of preforms for the present invention, a tight control of the temperatures can be beneficial to the regularity of the layers, in part by impacting the viscosity of the thermoplastic materials. The material for Stream-b (containing molten B-layer) can be injected at a similar temperature to the material for Stream-a (containing molten A-layer). A preferred temperature range for the material of Stream-a (containing molten A-layer) is between about 240° C. and about 305° C., alternatively from about 250° C. to about 300° C., alternatively from about 270° C. to about 290° C., alternatively from about 275° C. to about 285° C., and/or about 280° C. measured at the point of injection. The material for Stream-b (containing molten B-layer) can be at a temperature in a range from about 260° C. and about 310° C., alternatively from about 270° C. to about 300° C., alternatively from about 275° C. to about 285° C., and alternatively greater than or equal to about 280° C., measured at the point of the injection. The temperature of Stream-b can be higher than Stream-a. The temperatures can vary depending on the thermoplastic resins and the pigment loading of the stream. Lower temperatures and higher viscosities of the streams contribute to a better and more uniform formation of the layers. The difference between the viscosity of the streams need to be monitored well and adjusted to prevent malformed layers or anomalies in the flow, which can comprise the integrity of the final article.

Another process parameter, which must be controlled during the co-injection process of making the preforms, is the pressures of the streams, which are measured along the manifold line supplying the injection nozzle. Stream-a (which forms layer A) is preferably kept in the range between about 25 bar and about 400 bar, alternatively from about 30 bar to about 40 bar, and alternatively from about 34 to about 36 bar, while the lower temperature/higher viscosity Stream-b (which forms B-layer) is preferably kept in a range between about 1000 and about 1600 bars.

In order to preserve transparency of the A-layers, it is beneficial to quickly cool down the preform as soon as it is formed. The same it is true for the fast cooling of the article after it is formed from the stretch blow molding operation. A prolonged exposure at temperatures close to the glass transition temperature (Tg) of the resin may promote crystallization of the resin which in turn may be detrimental to transparency. Rapid cooling maintains an amorphous, transparent structure as much as possible.

When the preform is then released from the preform mold it can be immediately processed but more typically is cooled and stored and processed at a stretch blow molding station at a subsequent time and/or location. In a second step the preform is introduced into a stretch blow molding equipment where the preform is blow molded to its final shape via heating and stretching, typically using a core rod. In the ISBM process, differently than with other blow molding processes, the preform is reheated to a temperature warm enough to allow the preform to be inflated so that a biaxial molecular alignment in the sidewall of the resulting blow-molded container is achieved. With the preform held at the neck, air pressure, and usually a stretch rod, are used to stretch the preform in the axial direction, and optionally also in the radial direction. In the case of bottles the neck portion of the article can contain threads or flanges suitable for a closure and are typically unchanged with respect to the preform as the neck part is often not stretched. The articles obtained by injection stretch blow-molding can be significantly longer than the preform. More information on injection stretch blow-molding processes can be obtained from general textbooks, for example "The Wiley Encyclopedia of Packaging Technology", Second Edition (1997), published by Wiley-Interscience Publication (in particular see pages 87-89).

Many variations are possible to these steps, for instance the preform can be stretch blow molded within the same machine where the preform is made, but the two steps/two machines process is far more common.

The multilayer articles can be made by blow molding a co-injected preform wherein the preform can be made via parallel flow co-injection.

EXAMPLES

FIG. 3 is a photograph taken with a stereomicroscope of a cross-section of a preform. FIG. 3 shows how the thickness and ratio of A-layers to B-layers vary across the preform. FIG. 3 has points 4A, 4B, 4C, 4D, and 4E, which correspond to FIGS. 4A, 4B, 4C, 4D, and 4E, respectively. FIGS. 4A-E are photographs of the preform of FIG. 3 taken with a stereomicroscope at points A-E. FIGS. 4A-E show how the thickness and ratio of A-layers to B-layers vary at each point.

Figure 4A:
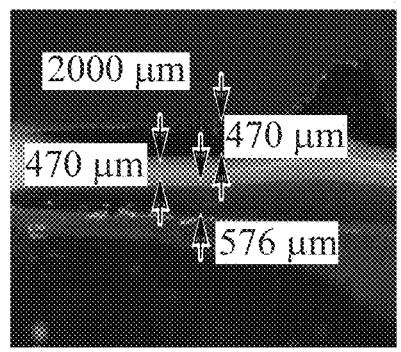
FIG. 4A is a photograph taken with microscopy of a section of the preform of FIG. 3 at point 4A.
Figure 4B:
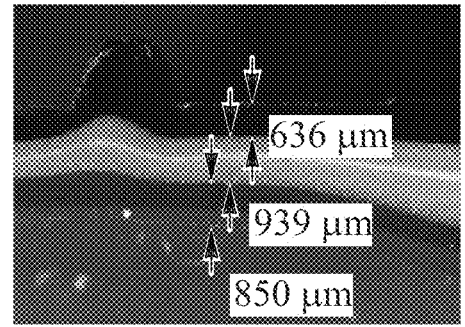
FIG. 4B is a photograph taken with microscopy of a section of the preform of FIG. 3 at point 4B.
Figure 4C:
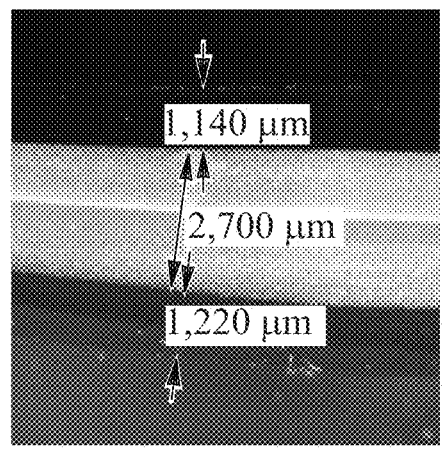
FIG. 4C is a photograph taken with microscopy of a section of the preform of FIG. 3 at point 4C.
Figure 4D:
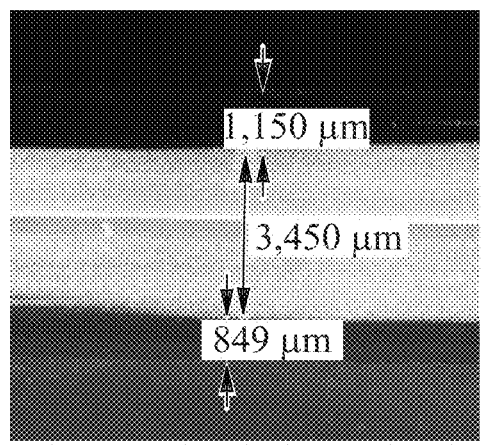
FIG. 4D is a photograph taken with microscopy of a section of the preform of FIG. 3 at point 4D.
Figure 4E:
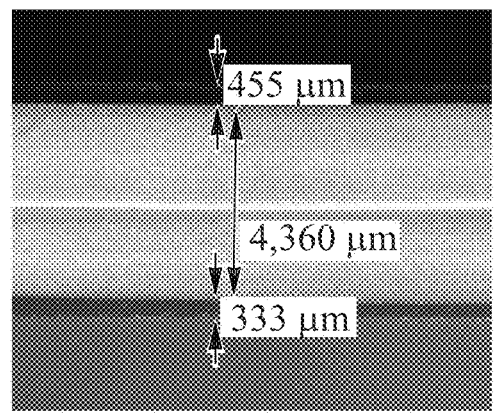
FIG. 4E is a photograph taken with microscopy of a section of the preform of FIG. 3 at point 4E.

FIG. 4A, is at the neck of the preform, which will eventually become the neck of the bottle, and two A-layers and one B-layer are discernable. In FIG. 4A, the ratio of A-layers to B-layer is greater than 2:1. In FIG. 4B, two A-layers and one B-layer are discernable. In FIG. 4B, the ratio of A-layers to B-layers is greater than 3:2. In FIGS. 4C-E, the B-layer is significantly wider than either A-layer. In FIG. 4C the ratio of A-layers to B-layers is less than 1:1. In FIG. 4D, the ratio of A-layers to B-layer is less than 3:5. In FIG. 4E, the A-layers appear very thin and the ratio of A-layers to B-layer is less than less than 1:5.

Figure 5:
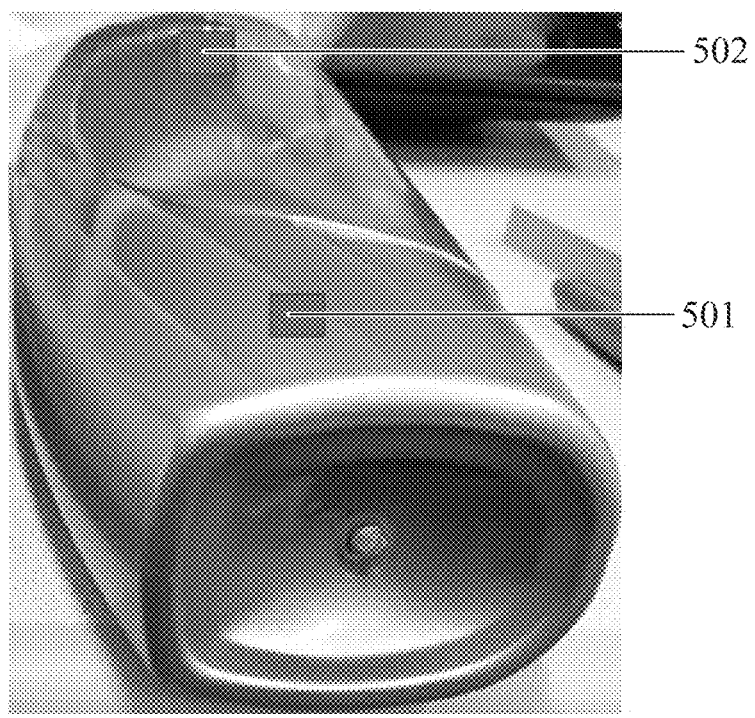
FIG. 5 is a photograph of a blow molded bottle.

FIG. 5 is a blow molded bottle with a color gradient. Boxes 501 and 502 represent portions that were cut for analysis via Micro-CT, as described in the Micro-CT Test Method described herein.

Figure 6A:
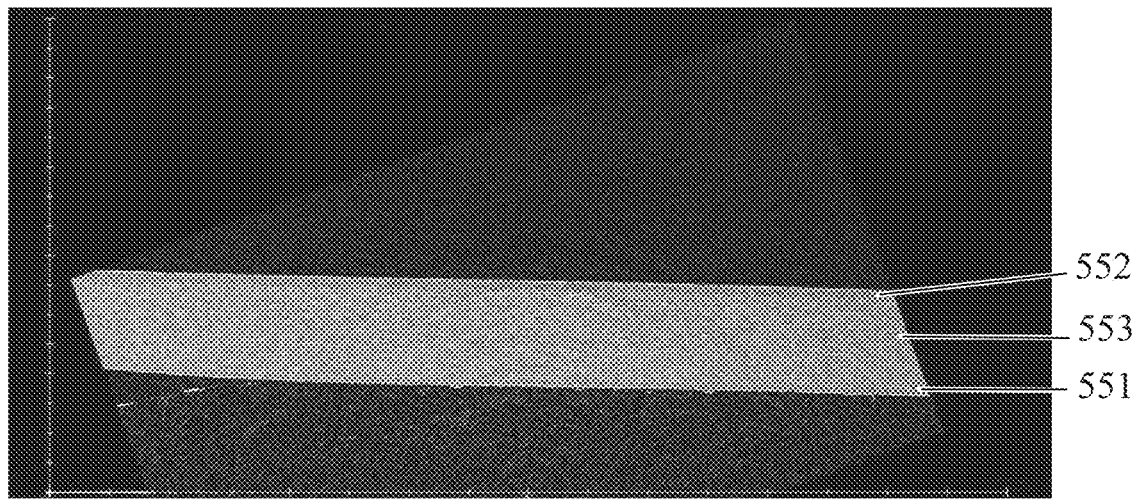
FIG. 6A is a cross-sectional (x-y) slice produced with a Micro-CT of a portion near the bottom of the bottle of FIG. 5.

FIG. 6A is a cross-sectional slice in the x-y plane from the Micro-CT voxel data of the portion 501 in FIG. 5, which is towards the bottom of the bottle. In FIG. 6A, B-layer 553 is almost the entire wall in this portion. A-layer 552 forms the outer surface of the wall and A-layer 551 forms the inner surface of the wall and are both represented as very thin areas in this image.

Figure 6B:
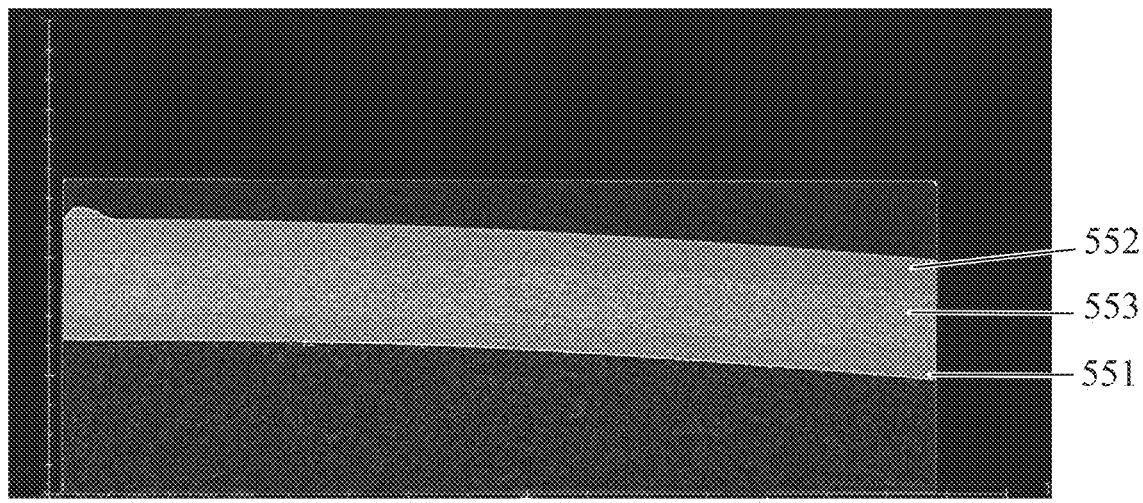
FIG. 6B is a cross-sectional (x-y) slice produced with a Micro-CT of a portion near the top of the bottle of FIG. 5.

FIG. 6B is a cross-sectional slice in the x-y plane from the Micro-CT voxel data of the portion 502 in FIG. 5, which is towards the top of the bottle, In FIG. 6B, A-layers 551 and 552 and B-layer 553 are visible. As compared to the image in FIG. 6A, B-layer 553 is narrower, and A-layers 551 and 552 are wider in FIG. 6B.

Test Methods

When the article is a container or a bottle, the critical normal load, gloss 20°, opacity, and spectrophotometry, measurements were all performed on a sample panel that was removed from the article. Samples with dimensions of 100 mm in length and about 50 mm in width are cut out from the main portion of the article wall and at last 50 mm away from should/neck and base regions.

When the article does not allow taking a sample this large, shorter samples in scale 1:2 width:length may be used as detailed further below. For containers and bottles, the sample is preferably removed from the label panel of the bottle at least 50 mm away from shoulder/neck or base regions. The cutting is done with a suitable razor blade or utility knife such that a larger region is removed, then cut further down to suitable size with a new single edge razor blade.

The samples should be flat if possible or made flat by using a frame maintaining the sample flat at least in the region where the test is done. It is important that the sample is flat to determine the Critical Normal Load, the gloss 20°, profilometry, opacity, and spectrophotometry.

Critical Normal Load (N) and Scratch Depth at Region of Failure

If the sample readily delaminates upon removal from the bottle, the sample is given a score of 0 N for the "Critical Normal Load". For samples which remain intact, they are subjected to scratch-induced damage using a Scratch 5 from Surface Machine Systems, LLC according to Scratch Test Procedures (ASTM D7027-13/ISO 19252:08) using a 1 mm diameter spherical tip, Initial Load: 1 N, End Load: 125 N, Scratch Rate: 10 mm/s, and Scratch Length of 100 mm. For samples smaller than 100 mm, the Scratch Length can be decreased while keeping the initial and end loads the same. This provides an estimate of the Critical Normal Load. Using this estimate, additional samples can be run over a narrower load range to provide more accurate determination of the Critical Normal Load.

Scratch-induced damage is performed on both sides of the sample corresponding to the inner and outer surface of the bottle. It is critical that the sample is affixed to the sample stage by the use of foam-based double-sided tape such as Scotch® Permanent Mounting Tape by 3M (polyurethane double-sided high-density foam tape with acrylic adhesive having a total thickness of about 62 mils or 1.6 mm, UPC #021200013393) on the underside of the sample. All samples are cleaned with compressed air before the scratch test.

The Point of Failure is visually determined after completing the scratch test as the distance across the length of the scratch at which the onset of visible delamination occurs. Delamination introduces an air gap between layers which is visible to the naked eye or with assistance of a stereomicroscope by one skilled in the art. as. This is validated based on a minimum three scratches per each side of the sample (defined as the cut out from bottle above) with a standard deviation of 10% or less. The side with lower Critical Normal Load is reported as the result of this method. The Scratch Depth at Region of Failure is measured according to ASTM D7027 across the scratch location at the point which the onset of delamination occurs. The Critical Normal Load (N) is defined as the normal load recorded at the location determined to be the Point of Failure. A Laser Scanning Confocal Microscope (KEYENCE VK-9700K) and VK-X200 Analyzer Software is used to analyze scratch-induced damage including the Point of Failure, Scratch Width, and Scratch Depth.

Gloss 20° Method

Gloss 20° is measured with a gloss meter at 20° micro-TRI-gloss (BYK-Gardner GmbH) according to ASTM D 2457/D523. Each point is measured three times and the mean is calculated to determine the gloss 20°. All gloss measurements were done over black background which we refer to as "Base Black." Base Black is the black area from the X-Rite Grey Scale Balance Card (45as45 L*a*b* 21.077 0.15-0.29). The measurements provided by the Micro-Tri Gloss meter have the unit "GU" which stands for "gloss units."

Local Wall Thickness

Wall thickness at specific locations was measured using an Olympus Magna-Mike® 8600 using a ⅛" dia. target ball. Three measurements were taken at each location and the mean was calculated to determine the local wall thickness.

The average local wall thickness was across the length of the article or panel and then calculating the mean. The thickness near the shoulder and near the base is excluded from the average local wall thickness.

Surface Roughness Measurement Method

Method 1: A sample panel is analyzed for Ra (arithmetical mean height) using a portable surface roughness tester such as the Surftest SJ-210 (Mitutoyo America Corporation) was placed at an even height of the bottle. The roughness is measured in units of μin.

Opacity Test Method

Opacity is measured on cut out portions of the bottle with a portable densitometer such as the X-rite 341C (X-Rite, Inc.) with 3 mm diameter aperture. The absolute optical density (D) is measured and then converted to Transmission (T) by $D = -\log_{10} T$ where % Opacity is 100−% T. Optical density (D) of 5.00=100% Opaque and 0.00=0% Opacity. Each point is measured three times and the mean is calculated to determine the % Opacity.

Micro-CT Method

Samples of the bottles to be tested are imaged using a micro-CT X-ray scanning instrument capable of scanning a sample having dimensions of approximately 5 mm×5 mm×3 mm as a single dataset with contiguous voxels. An isotropic spatial resolution of 2 μm is required in the datasets collected by micro-CT scanning One example of suitable instrumentation is the SCANCO Systems model μ50 micro-CT scanner (Scanco Medical AG, Brüttisellen, Switzerland) operated with the following settings: energy level of 55 kVp at 72 μA, 3600 Projections, 10 mm field of view, 700 ms integration time, an averaging of 5, and a voxel size of 2 μm. Test samples to be analyzed are prepared by cutting a rectangular piece of the plastic from the wall, preferably from flat areas such as label panel region with an X-Acto® knife and then further trimming the sample to approx. 5 mm in width using a fine-tooth X-Acto® saw with care to avoid causing cracks. The sample is positioned vertically with mounting foam material and placed into a plastic cylindrical scanning tube and secured inside the micro-CT scanner. The instrument's image acquisition settings are selected such that the image intensity contrast is sensitive enough to provide clear and reproducible discrimination of multiple layers within a material as well as the material itself from the exterior environment including air and mounting foam. Image acquisition settings that are unable to achieve this contrast discrimination or the required spatial resolution are unsuitable for this method. Scans of the plastic sample are captured such that a similar volume of each sample with its caliper is included in the dataset. Software for conducting reconstructions of the dataset to generate 3D renderings is supplied by the scanning instrument manufacturer. Software suitable for subsequent image processing steps and quantitative image analysis includes programs such as Avizo Lite 2019.1 (Visualization Sciences Group/FBI Company, Burlington, Massachusetts, U.S.A.), and MATLAB version R2020b with corresponding MATLAB Image Processing Toolbox (The Mathworks Inc. Natick, Massachusetts, U.S.A.).

Micro-CT data collected with a gray level intensity depth of 16-bit is converted to a gray level intensity depth of 8-bit, taking care to ensure that the resultant 8-bit dataset maintains the maximum dynamic range and minimum number of saturated voxels feasible, while excluding extreme outlier values.

A square section of the sample is cropped to approximately 2 mm×2 mm from the micro CT voxel data choosing regions free defects and nearly planer. The sample is then aligned to be parallel with the YZ plane of a global axis system using resampling. In other words, the normal of the bottle wall surface is parallel to the X plane/axis. This is accomplished by first labeling the plastic's voxels in the micro CT data using thresholding and connected components. The labeled voxel centers create a cloud of points that can be fitted to a plane using least square regression. Image processing that fails to find a least square plane nearly parallel to the largest face of the rectangular plastic's volume is unsuitable for this method. The fitted plane is used to rotate and resample the voxels points into the proper orientation.

The analysis is performed on the aligned 8-bit dataset that contains a rectangular section of material approximately 2 mm×2 mm that goes border to border in the YZ direction. It completely intersects the minimum Y border, the maximum Y border, the minimum Z border and the maximum Z border. A small non-material buffer of region will exist between the minimum X border and the maximum X border. This region will consist of air or packing material. A Global Material Threshold is determined for the sample by Otsu's method as implemented in Matlab. This threshold should identify the bottle material while minimizing noise and packing material.

YZ slices of voxel data are taken along the X axes. Each YZ slice can be viewed as a nearly uniform image that will contain either air (packing) or a single layer of the material. A small number of images will show transitions as the X value travels between regions. The average voxel intensity of each slice is plotted along the X axis at a resolution of 2 μm (the resolution of the micro CT scan). This plot of the average YZ slice intensities will be referred to the YZ Average plot. The YZ Average plot will have a low intensity through the air portion of the sample until it nears the edge of the material. As it approaches the edge, it will cross the Global Material Threshold and then achieve a local peak at the edge of the material due to "diffraction artifacts" from the micro-CT scan. The X location of this peak value will be recorded as the starting X location of the sample material. The starting X location on the opposite side of the sample can be found in a similar manner.

X values are now moved from the material starting locations to points inside the sample and away from the "diffraction artifact". The first local intensity minimum after the "diffraction peak" on the YZ Average plot will satisfy this requirement. The dataset is trimmed along the X axis such that all voxel points are within the sample but outside of the "diffraction affects". A Global Pigment Threshold can be determined from this subset of the dataset which contains only plastic by executing Otsu's method.

The X values inside the sample located on either side of the plastic are moved towards the center. Both moving X values will show a YZ Average plot intensity that crosses the Global Pigment Threshold. The X values of these crossings are recorded as the starting pigment edge location on the corresponding side of the sample. Distance measurements are calculated from recorded X positions described above.

Combinations

A. A blow molded multilayer article comprising:
   a hollow body defined by a wall comprising an inner surface and an outer surface;
   and a neck extending from the body to an orifice;
   wherein at least a first portion of the wall comprises at least three layers comprising: two A-layers forming the outer surface and the inner surface of the wall and a B-layer located between the A-layers;
   wherein the A-layers are transparent and optionally comprise a colored dye or pigment;
   wherein the B-layer comprises an effect pigment and/or an opacifying pigment;
   wherein the A-layers and B-layers comprise a thermoplastic resin;
   wherein the thickness of the A-layer varies;
   wherein the outer surface comprises an axial color gradient formed by constituents from the A-layer forming the outer surface.

B. The article according to Paragraph A, wherein the effect pigment or opacifying pigment is visible through the A-layers.

C. The article according to Paragraphs A-B, wherein the B-layer extends over the entire length of article wall and wherein the B-layer comprises a variable thickness.

D. The article according to Paragraphs A-C, wherein the hollow article further comprises a neck and a base and the B-layer has a thinner width at the neck as compared to the width of the B-Layer at the base.

E. The article according to Paragraphs A-D, wherein the B-layer forks and/or the A-layer forks.

F. The article according to Paragraphs A-E, wherein the outer surface of the body further comprises a surface roughness and wherein the surface roughness is substantially the same across the outer surface and wherein the surface roughness across the outer surface varies by less than 20 μin (0.508 μm), preferably less than 18 μin (0.4572 μm), alternatively less than 10 μin (0.254 μm), more preferably less than 5 μin (0.127 μm), and even more preferably less than 3 μin (0.0762).

G. The article according to Paragraphs A-F, wherein the surface roughness of a portion of the outer surface is less than 8 μin (0.2032 μm), preferably 5 μin (0.127 μm), more preferably less than 3 μin (0.0762), and even more preferably less than 2 μin (0.0508 μm).

H. The article according to Paragraphs A-G, wherein the surface roughness of a portion of the outer surface is from about 20 μin (0.508 μm) to about 42 μin (1.0668 μm), preferably from about 25 μin (0.635 μm) to about 40 μin (1.016 μm), more preferably from about 28 μin (0.7112 μm) to about 38 μin (0.9652 μm), and even more preferably from about 30 μin (0.762 μm) to about 36 μin (0.9144 μm).

I. The article according to Paragraphs A-G, wherein the outer surface of the body further comprises a gloss 20° and wherein the surface roughness is substantially the same across the length and/or width of the outer surface and wherein the gloss 20° along the length and/or width of the outer surface of the body varies less than 15 GUs, preferably less than 10 GUs, more preferably less than 5 GUs, and even more preferably less than 2 GUs.

J. The article according to Paragraphs A-I, wherein the outer surface of the body is glossy and comprises a gloss 20° from about 65 to about 110 GUs, preferably from about 68 GUs to about 100 GUs, more preferably from about 69 to about 95 GUs, and even more preferably from about 70 GUs to about 90 GUs.

K. The article according to Paragraphs A-J, wherein the outer surface of the body is glossy comprising a location with a gloss 20° of less than or equal to 15, preferably less than or equal to 12, more preferably less than or equal to 10, and even more preferably less than or equal to 7.

L. The article according to Paragraphs A-K, wherein the article has an opacity of from about 70% to about 100%, preferably from about 75% to about 95%, and more preferably from about 80% to about 93%.

M. The article according to Paragraphs A-L, wherein the % opacity can be greater than 70%, preferably greater than 75%, more preferably greater than 80%, and even more preferably greater than 85%.

N. The article according to Paragraphs L-M, wherein the opacity varies by less than 30%, preferably less than 25%, more preferably less than 22%, and even more preferably less than 20% over the length of the article.

O. The article according to Paragraphs A-N, wherein the neck is defined by the wall having an inner surface and an outer surface;
wherein the neck does not comprise a color gradient;
and wherein a portion of the outer surface of the neck comprises A-layer and wherein a portion of the outer surface of the neck comprises B-layer.

P. The article according to Paragraphs A-O, wherein the article had a Critical Normal Load greater than 100 N, preferably greater than 105, and more preferably greater than 110.

Q. The article according to Paragraphs A-P, wherein the effect pigment is a pearlescent pigment and wherein the effect pigment comprises from about 0.01% to about 10%, by weight of the B-layers.

R. The article according to Paragraphs A-Q, wherein the wall comprises a thickness of about 250 µm to about 1 mm, preferably from about 300 µm to about 700 µm, and more preferably from about 400 µm to about 600 µm, and even more preferably from about 450 µm to about 575 µm, and the average thickness of the wall panel varies by less than 30% over the length of the article.

S. The article according to Paragraphs A-R, wherein the thermoplastic resin is selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), polypropylene (PP), and a combination thereof.

T. The article according to Paragraph S wherein the multilayer article comprises polyethylene terephthalate.

U. The article according to Paragraphs A-T, wherein the article has a non-cylindrical shape.

V. A method for making a blow molded article comprising the following steps:
a. providing a preform mold for making a preform;
b. injecting Stream-b comprising a comprising the molten thermoplastic resin and an effect pigment and/or an opacifying pigment into the preform mold with a flowrate-b;
c. simultaneously or within 0.01-2 seconds of injecting Stream-b, injecting Stream-a comprising a molten thermoplastic resin into the preform mold with an initial flowrate-a;
d. accelerating the flowrate-a so it is faster than flowrate-b;
e. Stream-a blows through Stream-b and flows to the outside of Stream-b;
f. cooling to form a preform comprising an outside surface wherein at least a portion of the outside surface comprises a solidified Stream-a creating the color gradient;
g. blow molding the preform to form the article of Paragraphs A-U.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molded multilayer article comprising:
a hollow body extending from a base to a neck, the neck extending from the hollow body to an orifice, wherein the hollow body and the neck are defined by a wall comprising an inner surface and an outer surface;
wherein at least a first portion of the wall comprises at least five layers comprising:
at least two A-layers forming the outer surface and the inner surface of the wall, at least a B-layer located between the A-layers, wherein the A-layers and B-layer comprise a thermoplastic resin, a first interface layer comprising a region wherein the thermoplastic resin of the A-layer forming the outer surface and the thermoplastic resin forming the B-layer are interpenetrated, and a second interface layer comprising a region wherein the thermoplastic resin of the A-layer forming the inner surface and the thermoplastic resin forming the B-layer are interpenetrated;
wherein the A-layers are transparent and comprise a colored dye or pigment;
wherein the B-layer comprises an effect pigment and/or an opacifying pigment;
wherein the thickness of the A-layer forming the outer surface varies from the neck to the base;
wherein the outer surface comprises an axial color gradient extending along an entire length of the article, wherein the axial color gradient is formed by constituents from the A-layer forming the outer surface.

2. The blow molded multilayer article of claim 1, wherein the B-layer extends over the entire length of the article and wherein the B-layer comprises a variable thickness.

3. The blow molded multilayer article of claim 1, wherein the outer surface of the body is glossy and comprises a gloss 20° from about 65 to about 110 GUs.

4. The blow molded multilayer article of claim 1, wherein the outer surface has a surface roughness that varies less than 20 μin (0.508 μm) across the length and/or width of the outer surface of the body.

5. The blow molded multilayer article of claim 1, wherein a portion of the outer surface of the neck comprises at least one of the two A-layers and wherein a portion of the outer surface of the neck comprises the B-layer.

6. The blow molded multilayer article of claim 1, wherein the article has an opacity of from about 70% to about 95% and wherein the opacity varies by less than 25% over the length of the article.

7. The blow molded multilayer article of claim 1, wherein the article has a Critical Normal Load greater than 100 N according to Scratch Test Procedure (ASTM D7027-13/ISO 19252:08).

8. The blow molded multilayer article of claim 1, wherein the effect pigment is a pearlescent pigment and wherein the effect pigment comprises from about 0.01% to about 10%, by weight of the B-layer.

9. The blow molded multilayer article of claim 1, wherein the wall comprises a thickness of about 250 μm to about 1 mm and an average thickness of the wall varies by less than 50% over the length of the article.

10. The blow molded multilayer article of claim 9, wherein the wall comprises a thickness of about 250 μm to about 1 mm and the average thickness of the wall varies by less than 30% over the length of the article.

11. The blow molded multilayer article of claim 1, wherein the thermoplastic resin is selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), polypropylene (PP), and a combination thereof.

12. The blow molded multilayer article of claim 11, wherein the thermoplastic resin comprises polyethylene terephthalate.

13. The blow molded multilayer article of claim 1, wherein the article has a non-cylindrical shape.

14. The blow molded multilayer article of claim 1, wherein a portion of the wall next to the neck has a ratio of the thickness of the A-layers to the thickness of the B-layer greater than 1:1.

15. The blow molded multilayer article of claim 14, wherein a portion of the wall next to the neck comprises a ratio of the thickness of the A-layers to the thickness of the B-layer greater than 2:1.

16. The blow molded multilayer article of claim 14, wherein a portion of the wall next to the base comprises a ratio of the thickness of the A-layers to the thickness of the B-layer less than 1:1.

17. The blow molded multilayer article of claim 14, wherein a portion of the wall next to the base comprises a ratio of A-layers to B-layer less than 3:5.

18. The blow molded multilayer article of claim 1, wherein the outer surface of the wall comprises at least 85% of the A-layer.

19. The blow molded multilayer article of claim 1, wherein the outer surface of the wall comprises at least 95% of the A-layer.

* * * * *